(12) United States Patent
Growcock et al.

(10) Patent No.: US 7,037,881 B2
(45) Date of Patent: May 2, 2006

(54) STABILIZED COLLOIDAL AND COLLOIDAL-LIKE SYSTEMS

(76) Inventors: Frederick B. Growcock, 1514 Dodd La., Houston, TX (US) 77077; Gerard A. Simon, 4204 Bissonnet, West University Place, Houston, TX (US) 77005

( * ) Notice: Subject to any disclaimer, the term of this patent is extended or adjusted under 35 U.S.C. 154(b) by 0 days.

(21) Appl. No.: 10/771,079

(22) Filed: Feb. 3, 2004

(65) Prior Publication Data

US 2004/0171496 A1 Sep. 2, 2004

Related U.S. Application Data

(60) Provisional application No. 60/444,508, filed on Feb. 3, 2003.

(51) Int. Cl.
*C09K 8/38* (2006.01)

(52) U.S. Cl. ............... 507/102; 507/124; 507/202; 507/230

(58) Field of Classification Search ............... 507/102, 507/110, 114, 117, 120, 124, 202, 209, 213, 507/216, 219, 225, 230
See application file for complete search history.

(56) References Cited

U.S. PATENT DOCUMENTS

| 2,818,230 | A |  | 12/1957 | Davis ............... 255/1.8 |
| 3,900,420 | A |  | 8/1975 | Sebba ............... 252/307 |
| 4,155,410 | A |  | 5/1979 | Jackson et al. ....... 175/66 |
| 4,486,333 | A |  | 12/1984 | Sebba ............... 252/307 |
| 5,314,644 | A |  | 5/1994 | Michelsen et al. ..... 261/84 |
| 5,881,826 | A |  | 3/1999 | Brookey ............ 175/72 |
| 6,123,159 | A |  | 9/2000 | Brookey et al. ....... 175/72 |
| 6,148,917 | A | * | 11/2000 | Brookey et al. ...... 166/301 |
| 6,156,708 | A |  | 12/2000 | Brookey et al. ...... 507/102 |
| 6,390,208 | B1 |  | 5/2002 | Brookey ............ 175/72 |
| 6,422,326 | B1 |  | 7/2002 | Brookey et al. ....... 175/72 |
| 6,649,571 | B1 |  | 11/2003 | Morgan |  |
| 6,716,797 | B1 | * | 4/2004 | Brookey ............ 507/102 |
| 6,739,414 | B1 | * | 5/2004 | Brookey et al. ....... 175/72 |
| 6,770,601 | B1 | * | 8/2004 | Brookey ............ 507/102 |
| 2001/0027880 | A1 | * | 10/2001 | Brookey ............ 175/65 |
| 2003/0215946 | A1 | * | 11/2003 | Nair et al. .......... 435/395 |
| 2005/0003967 | A1 | * | 1/2005 | Rea et al. ........... 507/200 |

FOREIGN PATENT DOCUMENTS

WO WO 98/36151 8/1998

OTHER PUBLICATIONS

Article entitled: *Drill-In Fluids Improve High Angle Well Production*, Supplement to the Petroleum Engineer International, Mar. 1995.

Article entitled: *"Foams and Biliquid Foams—Aprhons,"* (Ch. 5, pp. 63-78) by Felix Sebba, John Wiley & Sons, 1987.

(Continued)

*Primary Examiner*—Philip C. Tucker
(74) *Attorney, Agent, or Firm*—Conley Rose, P.C.

(57) ABSTRACT

The present invention generally relates to improved compositions comprising stabilized colloidal or colloidal-like phases (e.g., emulsions, aphrons) and methods of using those compositions. The compositions generally comprise an aqueous continuous phase, one or more viscosifiers, one or more surfactants, aphrons and one or more Aphron Stabilizers. The compositions of the present invention possess aphrons with significantly increased half-life and enhanced ability to seal permeable formations, and are capable of being used in high pressure applications.

6 Claims, 3 Drawing Sheets

OTHER PUBLICATIONS

Article entitled: "*Hidraulica Forajului*," translation: YES, pp. 444-455, Oct. 26, 1982.

Article entitled "*Microbubbles: Generation and Interaction With Colloid Particles*," J.B. Melville and E. Matijevic, Institute of Colloid and Surface Science and Department of Chemistry, Clarkson College of Technology, Potsdam, NY., pp. 217-235, 1975.

Article entitled "*Separation of Organic Dyes From Wastewater by Using Colloidal Gas Aphrons*," D. Roy, K.T. Valsarlj, and S.A. Kottai, Marcel Dekker, Inc., Separation Science and Technology, 27(5), pp. 573-589, 1992.

SPE 39589 entitled "*Microbubbles: New Aphron Drill-in Fluid Technique Reduces Formation Damage in Horizontal Wells*," Tom Brookey, SPE, ActiSystems, Inc., Society of Petroleum Engineers, Feb. 18-19, 1998.

Article entitled "*Treatability of Water-based Drilling Fluids Using Colloidal Gas Aphrons*," D. Roy, K.T. Valsaraj, and V.J. Amedee, Department of Civil Engineering and Chemical Engineering, Louisiana State University, Fluid/Particle Separation Journal, vol. 5, No. 1, pp. 31-36, Mar. 1992.

PCT International Search Report to U.S. Appl. No. 60/444,537, PCT/US04/02947 filed Feb. 3, 2004.

PCT International Search Report to U.S. Appl. No. 60/444,508, PCT/US04/02960 filed Feb. 3, 2004.

* cited by examiner ions of matter and methods of using those compositions. More particularly, some of the embodiments of the present invention relate to compositions containing stabilized colloidal or colloidal-like phases (e.g., emulsions, aphrons) and methods of using such compositions.

STABILIZED COLLOIDAL AND COLLOIDAL-LIKE SYSTEMS

CROSS-REFERENCE TO RELATED APPLICATIONS

This application is related to commonly assigned, co-pending U.S. Provisional Application Ser. No. 60/444,508 filed Feb. 3, 2003 entitled Stabilized Colloidal and Colloidal-like Systems.

STATEMENT REGARDING FEDERALLY SPONSORED RESEARCH OR DEVELOPMENT

Not applicable.

FIELD OF THE INVENTION

The present invention generally relates to compositions of matter and methods of using those compositions. More particularly, some of the embodiments of the present invention relate to compositions containing stabilized colloidal or colloidal-like phases (e.g., emulsions, aphrons) and methods of using such compositions.

BACKGROUND OF THE INVENTION

Formation damage due to invasion by drilling fluids is a well-known problem. Many zones contain formation clays, which hydrate when in contact with water, such as the filtrate from water-based drilling fluids. These hydrated clays tend to block the producing zones, primarily sands, so that oil and gas cannot move to the borehole and be produced. These zones are also damaged by solids, which are carried into the openings with the drilling fluid. The movement of drilling fluids and filtrate through these openings also causes dislodging and migration of solids in place in the formation. These solids can lodge and block movement of produced hydrocarbons.

Fluid invasion is caused by the differential pressure between the hydrostatic pressure and fluid viscosity (equivalent circulating density (ECD)) and the formation pressure; differential pressure is especially large in low pressure or depleted zones. The rate of invasion is controlled by the differential pressure, the fluid viscosity, the structure of the pore network in the rock and any fissures in the rock that may be present. Drillers have long used filtrate control mechanisms to reduce the movement of drilling fluids and filtrate into and through the formation openings. The mechanism generally involves the creation of a filter cake along the borehole wall. This technique still allows some fluid in and out of the zone. Although some fluid loss may be desirable to provide a favorable drilling rate, too high a fluid loss can result in costly mud bills and excessive cake thickness, which can lead to other problems, such as differential sticking of the drill string.

More recent technology has seen the development of Low Shear Rate Viscosity (LSRV) fluids. High LSRV is generated by the addition of specialized viscosifiers to water or brines to form a drilling fluid. These viscosifiers have a unique ability to create extremely high viscosity at very low shear rates. These LSRV fluids have been widely used because of their solids suspension ability. They have been accepted as a way to minimize cuttings bed formation in high angle and horizontal wells, and as a way to reduce barite sag in deviated wells.

Recent studies and field experience indicate that high LSRV is helpful in controlling the invasion of filtrate by creating a high resistance to movement into the formation openings. Since the fluid moves at a very slow rate, viscosity becomes very high, and the depth of invasion of the fluid into the formation is kept shallow. This has been beneficial in protecting the zones from damage as well as reducing differential sticking in these fluids. (See, for example, the article entitled "Drill-In Fluids Improve High Angle Well Production", Supplement to the Petroleum Engineer International, March 1995).

Lost circulation (loss of whole drilling fluid) is also a severe problem in rotary drilling. Lost circulation occurs when the ECD is much greater than formation pressure. In the extreme case, ECD exceeds formation strength, and the rock fractures. Whether in pores or fractures, the openings in the rock are able to accept and store drilling fluid so that none is returned to surface for recirculation. Whole drilling fluid is lost rapidly downhole and can become an expensive and dangerous problem. Lost circulation can lead to hole instability, stuck drill pipe, and loss of well control. At the least, lost circulation halts drilling operations and requires expensive replacement fluid volume to be used.

In addition to the fluid volume being lost, expensive lost circulation materials (LCM) are required. These are usually fibrous, granular, or flake materials such as cane fibers, wood fibers, cottonseed hulls, nut hulls, mica, cellophane, and many other materials. These LCM are added to the fluid system so that they may be carried into the loss zone and lodge to form a bridge on which other materials may build a seal akin to a filter cake. LCM themselves are damaging to the zones, and because they often must be carried in the drilling fluid to maintain circulation, solids removal is halted and buildup of solids in the mud results.

Methods of correcting lost circulation of drilling fluids by aerating the drilling fluids are set forth in U.S. Pat. No. 2,818,230 (Davis) and U.S. Pat. No. 4,155,410 (Jackson). However, traditional aerated fluids also have disadvantages. Problems with these fluids include hole cleaning, control of formation fluids and corrosion. Standard pumping equipment will experience cavitation, so that expensive, often hard-to-get equipment such as compressors and boosters are required. In addition, such fluids are not recirculateable and must be constantly generated as the drilling proceeds.

In light of the deficiencies of the prior methods, there is still a great need for fluids that can rapidly seal formation fractures and/or inhibit the excessive loss of drilling fluids. In particular, some attractive fluid based systems incorporate aphrons, which are described in U.S. Pat. Nos. 5,881,826, 6,123,159, 6,148,917, 6,156,708, 6,390,208, 6,422,326 and PCT WO 98/36151.

SUMMARY OF THE INVENTION

In accordance with the spirit of the present invention, novel fluids comprising stabilized colloidal or colloidal-like phases (e.g., emulsions, aphrons) are described herein. One property of fluids comprising aphrons is their ability to seal openings in a formation during drilling or other downhole operations. In this invention, the aphrons are stabilized through the use of one or more novel Aphron Stabilizers, so that their ability to seal openings in a formation is enhanced significantly. These fluids are capable of being recirculated in the wellbore during drilling or other downhole activities.

Several embodiments are disclosed as being illustrative of the spirit of the invention. For example, in one embodiment, the fluid composition comprises an aqueous fluid, one or more viscosifiers, one or more surfactants, aphrons, and one or more Aphron Stabilizers. Without wishing to be bound by a theory, it is believed that the Aphron Stabilizer modifies the viscosity of the water layer to such an extent that it, in effect, creates an elastomeric membrane. This elastomeric membrane allows the aphrons of the present invention to display improved stability and sealing capability, as compared to previously known aphrons.

Methods of use for enhanced aphron containing fluids are also described herein. For example, the fluids can be used to assist in the effective sealing of the formation. These and other embodiments of the present invention, as well as their features and advantages, will become apparent with reference to the following detailed description.

BRIEF DESCRIPTION OF THE DRAWINGS

For a more detailed understanding of the preferred embodiments of the invention, reference will now be made to the accompanying drawings, wherein.

NOTATION AND NOMENCLATURE

Figure 1:
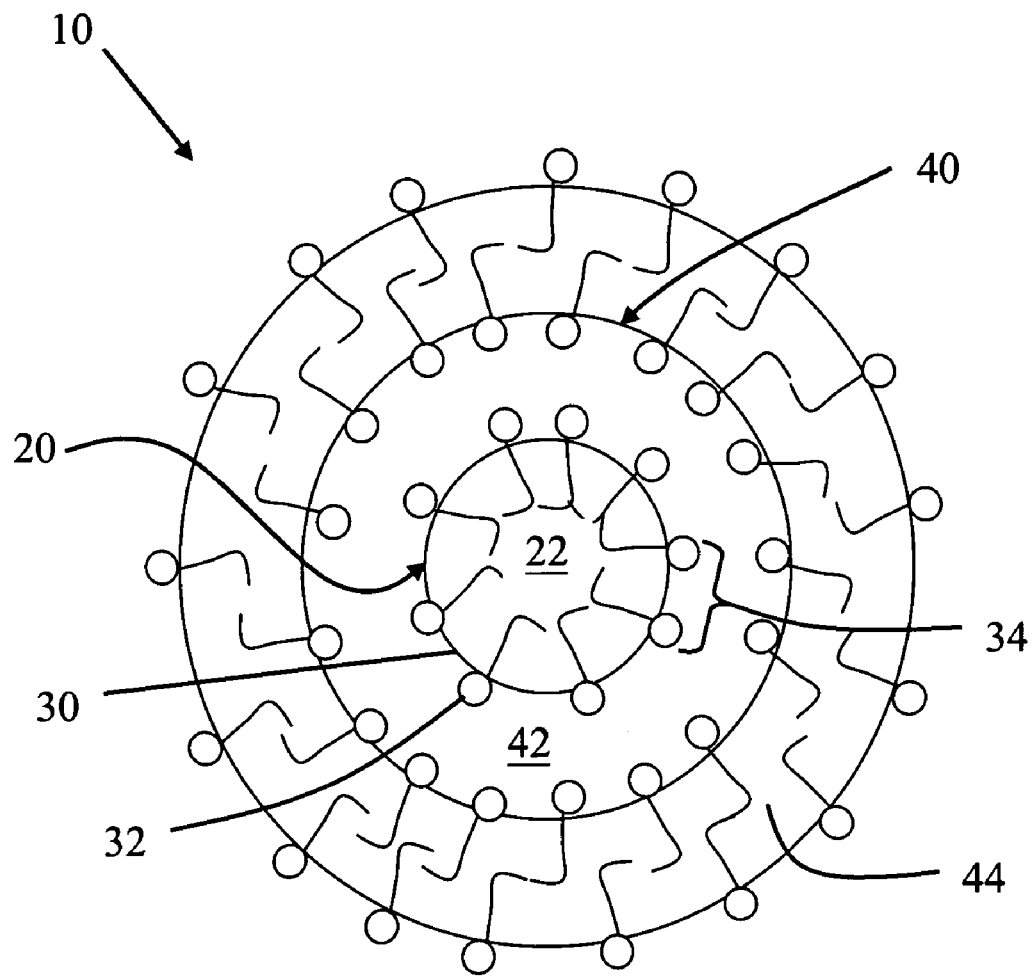
FIG. 1 is a schematic drawing of a prior art aphron.

In the following discussion and in the claims, the terms "including" and "comprising" are used in an open-ended fashion, and thus should be interpreted to mean "including, but not limited to . . . " Certain terms are used throughout the following description and claims to refer to particular system components. For example, "bulk fluid" is intended to mean the fluid composition as a whole, including the aqueous fluid and any species that may be added to it. "Bulk viscosity" is intended to refer to the viscosity, or the property of resistance to flow in the bulk fluid. "Interfacial viscosity" is intended to refer to the viscosity at the interface between two fluids in contact with each other (e.g., the viscosified water layer of an aphron and the surrounding bulk fluid). Similarly, "interfacial tension," also known as surface tension when applied to the interface between a fluid and air, is intended to refer to the property of liquids arising from unbalanced molecular cohesive forces at or near the surface, as a result of which the surface tends to contract and has properties resembling those of a stretched elastic membrane.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

DETAILED DESCRIPTION OF THE PREFERRED EMBODIMENTS

The present invention generally relates to compositions comprising stabilized colloidal or colloidal-like phases and methods of using those compositions. Although many detailed embodiments of the present invention will be discussed herein, the fundamental idea is to provide stable, long-lasting compositions and methods for preparing and using such compositions. Some embodiments of the present invention relate to fluid compositions and methods of use of enhanced aphron containing fluids in downhole applications. In particular, it is wholly within the scope and spirit of the invention for the detailed compositions disclosed herein to be circulated in the column while drilling, logging, workover, servicing, or any other downhole operation is occurring. However, reference to downhole applications is not contemplated as the only use for the compositions of the present invention and should not be so limited. Thus, it should be appreciated that the compositions, form of the compositions, and methods of use for the compositions provided herein are only for the sake of clarity and in the interest of presenting embodiments of the present invention.

As will be shown herein, these fluids have many advantages and uses, such as assisting in the effective sealing of the formation, including sealing microfractured and large fractured zones.

Fluid systems containing aphrons are known in the art. In general, an aphron-containing drilling fluid combines the use of LSRV-generating viscosifiers with surfactants to form aphrons. The aphrons can be obtained, for example, by incorporating (1) an aphron-generating surfactant into the fluid and thereafter generating the aphrons in the fluid by introducing into it a gas or (2) generating the aphrons in a liquid compatible with the fluid and mixing the two fluids together. The book by Felix Sebba entitled "Foams and Biliquid Foams—Aphrons," John Wiley & Sons, 1987, incorporated herein by reference, is an excellent source on the preparation and properties of aphrons, i.e., microbubbles. Aphron-containing fluids are an improvement to the problems associated with traditional aerated fluids.

Referring initially to FIG. 1, an aphron 10 is typically made up of a spherical core or internal phase 20, which is usually gas 22 encapsulated in a thin shell 30. This shell 30 contains surfactant molecules 32 positioned so that they produce an effective first barrier 34 against a second phase 40 comprised of viscosified water 42. Second phase 40 also contains surfactant molecules 32 positioned so that the hydrophobic portion of the molecules extend into a third phase 44. The latter contains still another layer of surfactant molecules 32 aligned with the hydrophilic (polar) extending into the bulk fluid. Thus, phase 44 is a bi-layer of surfactant molecules, which serves as an effective barrier to coalescence with adjacent aphrons (not shown). In summary, the gas core is stabilized by three layers of surfactant molecules and a viscosified aqueous layer. It is believed that the outermost surfactant layer is not strongly associated with the rest of the aphron and may be shed when aphrons are forced against each other, thereby leading to agglomeration but not coalescence. Aphron generation can be accomplished by any means known in the art, such as methods described in the book by Felix Sebba mentioned above.

Two major components for creating stable aphrons are surfactants and viscosifiers. The surfactants are responsible for the formation of the aphrons' unique layers. These surfactants must be arranged in such a way that the aphron structure is compatible with the base liquid and the viscosifier therein such that the LSRV of the fluid can be maintained. The aphron-generating surfactant may be anionic, non-ionic, or cationic depending on compatibility with the viscosifier. Anionic surfactants include, for example, alkyl sulfates, alpha olefin sulfonates, alkyl (alcohol) ether sulfates, refined petroleum sulfonates, and mixtures thereof. Non-ionic surfactants include, for example, ethoxylated alcohols and amine oxides. Cationic surfactants include, for example, quaternary salts.

Generally, stable aphron-containing fluids are obtained by increasing the LSRV of the fluid to at least 10,000 centipoise (Brookfield viscosity at 0.06 sec$^{-1}$). Because the stability of the aphrons is enhanced as the LSRV increases, a LSRV of more than 100,000 centipoise may be desired. This is accomplished with appropriate viscosifiers. In general, suitable viscosifiers include organic polymers; inorganic polymers; dispersed clays; dispersed minerals; mixed metal hydroxides, oxyhydroxides and oxides; biopolymers; water-soluble synthetic polymers; other types of polymers; and mixtures thereof. Many suitable viscosifiers are listed in U.S. Pat. Nos. 5,881,826, 6,123,159, 6,148,917, 6,156,708, 6,390,208, 6,422,326 and PCT/US98/02566.

The present invention provides compositions and methods of use that are an improvement over the existing aphron technology. For example, fluids in accordance with the present invention possess tougher, more resilient surfaces that allow aphrons to survive for long, extended periods of time under severe conditions (e.g., high pressure). Because of their increased stability, the enhanced aphrons are able to seal permeable zones more effectively. All of these added benefits and others can lead to reduced operating costs.

Figure 2:
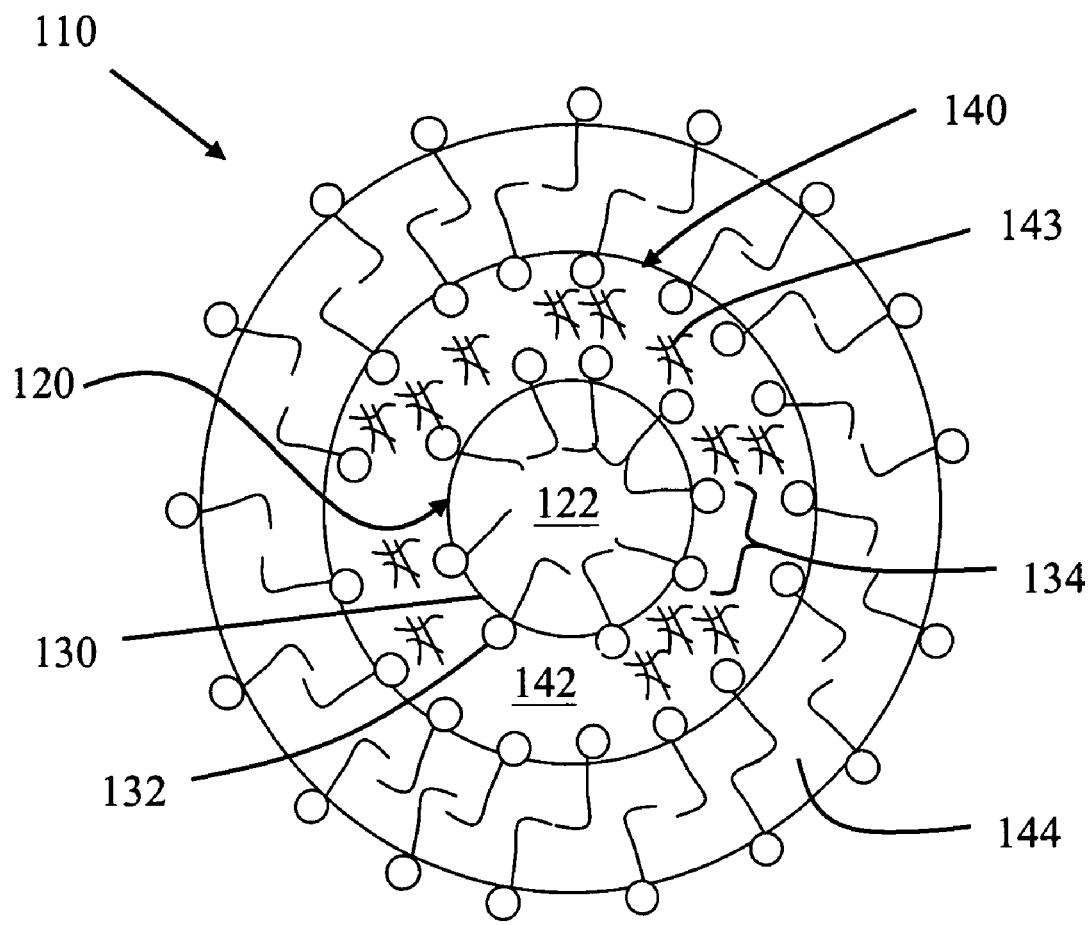
FIG. 2 is a schematic drawing of an enhanced aphron in accordance with a preferred embodiment of the present invention.

Referring now to FIG. 2, an aphron 110 in accordance with the present invention is shown. Similar to FIG. 1, aphron 110 includes a spherical core or first phase 120, which is usually gas 122 encapsulated in a thin shell 130. This shell 130 contains surfactant molecules 132 positioned so that the hydrophobic (nonpolar) ends extend into the gas core 122 and the hydrophilic (polar) ends extend into a second phase 140 comprised of viscosified water 142 and an Aphron Stabilizer 143. The second phase 140 also contains surfactant molecules 132 at the outer boundary, as in a conventional aphron, with the hydrophobic ends extending into a third phase 144. This third phase also contains a third layer of surfactant molecules 132 whose hydrophilic ends extend into the bulk fluid. Thus, phase 144 is a bi-layer of surfactant molecules, which serves as an effective barrier to coalescence with adjacent aphrons (not shown). As with a conventional aphron, it is believed that the exterior surfactant layer is not strongly associated with the rest of the aphron and may be shed when aphrons come into contact with each other so that they agglomerate rather than coalesce. It should be noted that, although all three surfactant molecules are labeled 132, they are not necessarily the same material, i.e., each surfactant layer may be comprised of different types of surfactants.

Second phase 140 is of particular importance in creating stability in aphrons. This will be discussed in further detail below.

As set forth in the "Summary of the Invention," the fluid composition in one embodiment of the present invention comprises an aqueous fluid, one or more viscosifiers, one or more surfactants, aphrons, and one or more Aphron Stabilizers. At moderate gas concentrations, the stability of bubbles in an aqueous medium is a function primarily of bulk fluid viscosity and interfacial tension. Bulk viscosity is generally derived from polymers or polymer-like molecules, e.g., xanthan gum and/or clays. Interfacial tension is usually lowered with a surfactant. However, in contrast to a typical bubble, an aphron is stabilized by a very high interfacial viscosity of the second phase.

In typical aphron-containing liquids, the interfacial viscosity of second phase 40 of the aphron is approximately equal to the bulk viscosity of the liquid, inasmuch as second phase 40 is occupied by the same species that are in the bulk fluid (not shown).

However, it has been discovered that strong interaction between (1) an Aphron Stabilizer and the surfactant, (2) an Aphron Stabilizer and the viscosifier, (3) an Aphron Stabilizer and reactive solids, e.g., MgO, and/or (4) an Aphron Stabilizer and gas in the spherical core or first phase 120 can lead to an increase in interfacial viscosity above that of the bulk viscosity. This strong interaction may be created by various types of bonding, such as polymer cross-linking and hydrophobic-hydrophobic entanglement. The increase in interfacial viscosity imparts increased stability to aphron 110. Various types of materials may be used as an Aphron Stabilizer, which may be able to undergo a strong interaction within the second phase 140 as described above. It is believed that the surfactant, reactive materials that could be associated with the surfactant, and/or the gas in first phase 120 can aid the Aphron Stabilizer to generate a tough elastomeric membrane.

Suitable Aphron Stabilizers include, but are not limited to, the following compositions: biopolymer/magnesium oxide/sodium chloride, polyacrylamide/chromic acetate, doubly derivatized HEC/Fe$^{2+}$, liquid rubber bases, liquid wax bases, water soluble glues (e.g. Elmer's glue), polyvinyl alcohol (PVOH)/alkyl ether sulfates, PVOH/betaines, and mixtures thereof. For certain preferred embodiments, the Aphron Stabilizer comprises at least PVOH and a betaine or an alkyl ether sulfate and mixtures thereof. In one embodiment, the Aphron Stabilizer comprises from about 0.05% to about 2% of the net weight of the fluid composition, preferably from about 0.1% to 1%.

The surfactant, materials associated with the surfactant, the gas in first phase 120, and any additional viscosifiers may be selected from suitable species known in the art and disclosed above. The fluid compositions may additionally contain weighting agents, corrosion inhibitors, soluble salts, biocide, fungicides, seepage loss control additives, bridging agents, deflocculants, lubricity additives, shale control inhibitors, foam suppressors, and other additives as desired.

The aqueous liquid may be fresh water, sea water, or a brine containing soluble salts such as sodium chloride, potassium chloride, calcium chloride, magnesium chloride, sodium bromide, potassium bromide, calcium bromide, zinc bromide, sodium formate, potassium formate, cesium formate, and mixtures thereof. The brine may contain one or more soluble salts at any desired concentration.

In addition, if necessary, air or other gases can be incorporated into the fluid to entrain more gas for forming aphrons 110. The gas may be any gas which is not appreciably soluble in the liquid phase of the fluid. For example, the gas may be air, nitrogen, carbon dioxide, organic gases, and the like, including air encapsulated in the fluid during mixing.

The aphrons 110 can be generated by any means known in the art, including the means taught by Sebba. The following "Example" section highlights the performance of the enhanced aphrons made in accordance with the present invention.

EXAMPLE

Four different bulk fluid compositions were prepared. A list of the components used and the resultant LSRVs (Brookfield viscosity at 0.06 sec$^{-1}$) are given in Tables 1 and 2, respectively.

TABLE 1

Bulk Fluid Compositions

| | Composition | | | |
|---|---|---|---|---|
| Component | Ex. 1 | Ex. 2 | Ex. 3 | Ex. 4 |
| Water (bbl) | 341.5 | 340 | 340 | 340 |
| Soda Ash (lb/bbl) | 0.25 | 0.25 | 0.25 | 0.25 |
| Biopolymer blend (lb/bbl) | 5 | 5 | 5 | 5 |
| Polymer blend (lb/bbl) | 5 | 5 | 5 | 5 |
| PH buffer (lb/bbl) | 2 | 2 | 2 | 2 |
| Surfactant (lb/bbl) | 0 | 0 | 2 | 1 |
| Aphron Stabilizer (lb/bbl) | 1 | 2 | 0 | 1 |

TABLE 2

LSRV for Bulk Fluids

| | Ex. 1 | Ex. 2 | Ex. 3 | Ex. 4 |
|---|---|---|---|---|
| 1' | 138,000 | 136,000 | 133,000 | 138,000 |
| 2' | 147,000 | 140,000 | 138,000 | 138,000 |
| 3' | 150,000 | 142,000 | 140,000 | 142,000 |

Referring to Table 1, the biopolymer blend used is a xanthan gum-based blend comprised of approximately 70 wt % xanthan gum, 20 wt % starch, 9 wt % oligosaccharide, and 1 wt % magnesium oxide, sold by MASI Technologies L.L.C., a joint venture between M-I L.L.C. and ActiSystems Inc., under the tradename Go Devil II™. The polymer blend used is an oligosaccharide-based blend comprised of approximately 90 wt % oligosaccharide and 10 wt % magnesium oxide, sold by MASI Technologies L.L.C., a joint venture between M-I L.L.C. and ActiSystems Inc., under the tradename Activator I™. The pH buffer used is a magnesium oxide-based blend comprised of approximately 90 wt % magnesium oxide and 10 wt % oligosaccharide, sold by MASI Technologies L.L.C., a joint venture between M-I L.L.C. and ActiSystems Inc., under the tradename Activator II™. The surfactant used is an alcohol ether sulfate-based blend comprised of approximately 18 wt % alcohol ether sulfate, 8 wt % cocobetaine, 1 wt % hydroxypropylguar, and 73 wt % water, sold by MASI Technologies L.L.C., a joint venture between M-I L.L.C. and ActiSystems Inc., under the tradename Blue Streak™. The Aphron Stabilizer used is a PVOH-based blend comprised of approximately 30 wt % PVOH, 6 wt % cocamidopropyl betaine (CAPV), and 64 wt % water.

All the components listed in Table 1 are believed to have a primary function in the resultant fluids. For example, the soda ash is believed to be a hardness buffer and the biopolymer blend is believed to be the primary viscosifier of the bulk fluid. The polymer blend is believed to be a filtration control agent and thermal stabilizer and the surfactant is believed to serve as the aphron generator. Finally, the Aphron Stabilizer is believed to be a cross-linkable polymer which becomes cross-linked or interacts strongly with the other materials present in the viscosified water layer of the aphrons: As indicated in Table 2, the presence of the Aphron Stabilizer does not affect the bulk viscosity of the fluid.

The fluid compositions may have a pH in the range from about 7.0 to 11, preferably from about 8.0 to about 10.5. The pH can be obtained (as is well known in the art) by the addition of bases to the fluid, such as potassium hydroxide, potassium carbonate, potassium humate, sodium hydroxide, sodium carbonate, sodium humate, magnesium oxide, calcium hydroxide, zinc oxide, and mixtures thereof. As shown in Table 1, magnesium oxide is a preferred pH buffer.

In addition to the components listed in Table 1, other additives including shale inhibitors and foam suppressors may be used if desired. An example of a suitable shale inhibitor is a cottonseed oil-based blend, which is comprised of approximately 61 wt % cottonseed oil and 39 wt % lecithin. Examples of suitable foam suppressors include oligomers such as glycol ether and propylene glycol.

Aphron generation was accomplished by entraining air under ambient conditions with a Silverson LV-4 mixer with disintegrator head rotating at 7000 rpm for 6 min. The resultant composition showed aphrons with increased stability, as indicated by their half-life in Table 3. Half-life is herein defined as the length of time that must pass for a fluid sample in an open cup at room temperature and pressure to lose half of the entrained air and is measured from the difference in initial density (immediately after entraining air as described above) and after 3 hr:

$$T_{1/2}(hr) = 2.08 \ln^{-1}[\% \text{ Air}_{3\ hr} / \% \text{ Air}_{initial}]$$

TABLE 3

Aphron Half-life

| | Ex. 1 | Ex. 2 | Ex. 3 | Ex. 4 |
|---|---|---|---|---|
| $T_{1/2}$ (hr) | 8.0 | 11.7 | 12.6 | 202.1 |

Alternatively, the aphrons can be generated using the procedures and equipment taught by Sebba in U.S. Pat. No. 3,900,420 and Donald Michelsen in U.S. Pat. No. 5,314,644. The fluid containing the aphrons can then be continuously directed to a desired location.

From the above tables, it is apparent that Ex. 4, which represents the only composition that contained the surfactant and Aphron Stabilizer, had a half-life more than an order of magnitude greater than any of the other samples prepared. Referring back to Table 2, this increase in half-life is interesting because the overall LSRV for the bulk fluid of Ex. 4 is comparable to the other samples. Therefore, it is believed that the increased half-life is caused by the aphrons' increased interfacial viscosity above that of the bulk viscosity of the fluid.

Figure 3:
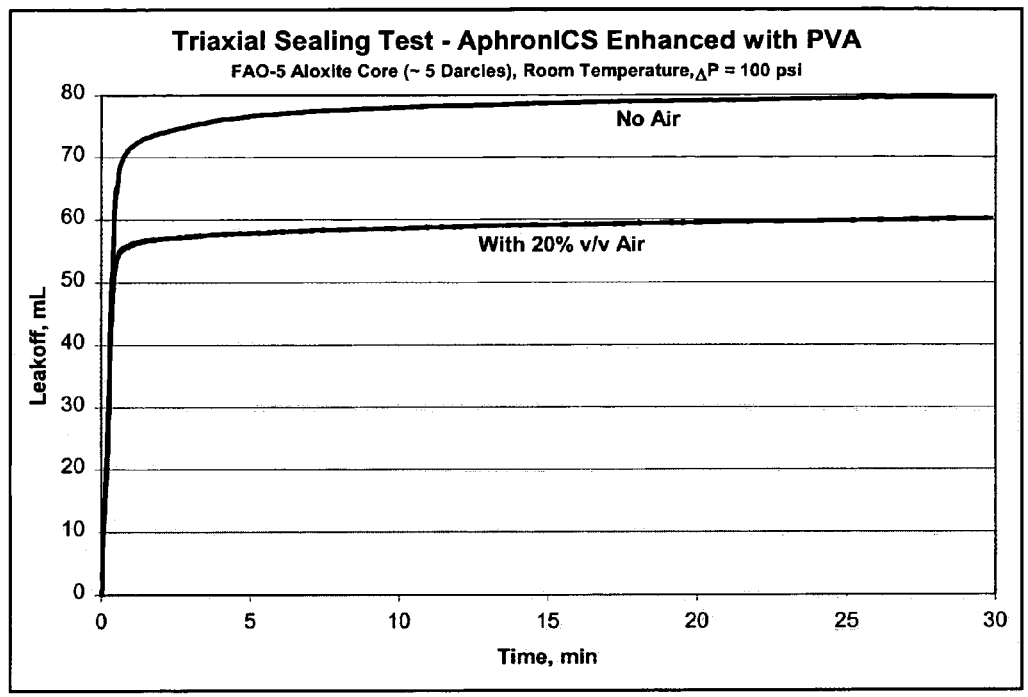
FIG. 3 is a graph showing the improved sealing effects of a fluid composition prepared with enhanced aphrons.

The enhanced aphrons also showed improved sealing capabilites, as indicated by FIG. 3. In FIG. 3, a fluid containing enhanced aphrons (with ~20% Entrained Air) showed a leak-off reduction in a high-permeability core of about 25% compared to an air-free enhanced aphron system or a conventional aphron system.

A second set of experiments was conducted to evaluate leak-off and half life with a variety of surfactants used as the Aphron Stabilizer in combination with a preferred cross-linkable polymer, i.e., PVOH. The results are shown in Figure 4 below:

FIG. 4. Effect on Half-life and Leak-off with Alternative Surfactant Stabilizers

| Components (lb/bbl) | Sample ID | | | | | | |
|---|---|---|---|---|---|---|---|
| | 100 | 101 | 102 | 103 | 104 | 105 | 106 |
| Water | 340.5 | 340 | 340 | 340 | 340 | 340 | 340 |
| Soda Ash | 0.25 | 0.25 | 0.25 | 0.25 | 0.25 | 0.25 | 0.25 |
| Biopolymer blend | 5 | 5 | 5 | 5 | 5 | 5 | 5 |
| Polymer blend | 5 | 5 | 5 | 5 | 5 | 5 | 5 |
| pH buffer | 2 | 2 | 2 | 2 | 2 | 2 | 2 |
| Surfactant | 1 | 1 | 1 | 1 | 1 | 1 | 1 |
| Monateric COAB | | 1 | | | | | |
| Witcolate 1259 | | | 1 | | | | |
| Witconate 3203 | | | | 1 | | | |
| Mirataine BET-C 30 | | | | | 1 | | |
| Mirataine BET-O 30 | | | | | | 1 | |
| Mirataine BB | | | | | | | 1 |
| Celvol 540S (PVOH) | 0.0 | 0.5 | 0.5 | 0.5 | 0.5 | 0.5 | 0.5 |
| Half-Life, $t_{1/2}$ (hr) | 14.8 | 484 | 201 | 80.49 | 78.23 | 44.71 | 179 |
| Leak-Off (mL) | 80 | 40.8 | 27 | * | * | * | 28.2 |

* not measured

The base components of these additional compositions contained in Table 4 are the same as those described in Table 1: biopolymer blend, polymer blend, pH buffer and surfactant, which are comprised of Go-Devil II™, Activator I™, Activator II™ and Blue Streak™, respectively. Samples 101–106 further comprise an aphron stabilizing surfactant and an aphron stabilizing cross-linkable polymer. The cross-linkable polymer in all these samples was polyvinyl alcohol, sold commercially by Celanese under the tradename Celvol 540S. The surfactant stabilizers were varied for each sample and are identified as Monateric COAB, sold by Uniqema, Witcolate 1259 and Witconate 3203, sold by Akzo Nobel, and Mirataine BET-C 30, Mirataine BET-O 30 and Mirataine BB, sold by Rhodia.

As shown in Table 4, the addition of a stabilizing surfactant/polymer blend in accordance with one embodiment of the present invention significantly improves the half-life to at least about 44 hours from a base of about 14 hours. In addition, the leak-off was reduced by about 50% for sample 101 and by 65% or greater for samples 102 and 106.

The quantity of aphrons in the fluids may be determined by the % Entrained Air in the fluid, which in turn is determined from the relative density of the bulk fluid do compared to its gas-free theoretical density $d_t$:

% Entrained Air = $[(d_t - d_0)/d_t] \times 100$

In one embodiment, the % Entrained Air is maintained between about 10% to about 20% of the net volume of the fluid, preferably from about 12% to 18%. The density of the bulk fluid can be monitored and additional surfactant and aphron generator added as necessary to maintain the desired density.

In one embodiment, the present invention is intended to help prevent the loss of circulating fluid into the formation by incorporating the enhanced aphrons into a drilling or servicing fluid or any other type of downhole fluid. The present invention is not limited to any particular formation zone. The embodiments of the invention can be useful for promoting sealing of all types of formation zones where fluid can be lost. For example, the present invention can be useful in sealing or enhancing sealing of formation fractures. As noted above, formation fractures vary in size and shape from microscopic to small caves. For smaller fractures, i.e., about 10 μm or less, normal drilling fluid sealants can be effective, but the present invention may be used as an enhancement to strengthen, stabilize or reduce the time necessary to build the plug.

Because the aphrons have a low density, they will reduce the net density of the fluids they are in and will tend to float in most fluids. Thus, it is critical to keep the aphrons adequately mixed or agitated during preparation while traveling through the drillstring. Mixing and agitation is accomplished through any means known in the art.

In addition to or in place of agitation or mixing and/or dilution, an additive can be incorporated into the bulk fluid that helps maintain uniform distribution of the aphrons. Additives can also help maintain pumpability of the fluid. The more preferred additives are viscosifiers. Suitable viscosifiers are limited only by their compatibility with the base fluid and the aphrons and should exhibit LSRV and/or suspension properties. For example, in aqueous based fluids, any water-soluble viscosifier would suffice, e.g., organic, inorganic or biopolymers, clays, or other polymer-like chemicals. In a preferred embodiment, a LSRV biopolymer is added the fluid. The preferred biopolymers according to the present invention comprise a xanthan gum.

Also provided herein are methods of using the above-mentioned compositions. In one embodiment, a fluid composition comprising an aqueous fluid, one or more surfactants, aphrons, and one or more Aphron Stabilizers, is pumped downhole at elevated pressures, e.g., 2,000+ psi, using a cavitating pump. The aphrons are formed from dissolved gas in the fluid composition or from air entrained at ground level under ambient conditions. The aphrons of the present invention are stable even under elevated pressures of greater than or equal to about 2,000 psi, preferably stable at pressures of greater than or equal to about 5,000 psi, and more preferably stable at pressures of greater than or equal to about 8,000 psi.

During drilling, the aphrons are compressed due to the excess pressure of the column, and the aphrons enter the formation fractures. The pressure is less within the fractures allowing the aphrons to expand. The expansion of the aphrons, coupled with their aggregation within the fracture, can effectively fill and seal the fracture. The enhanced aphrons preferably have a half-life of greater than or equal to about 20 hours, more preferably have a half-life of greater than or equal to about 75 hours, and still more preferably have a half-life of greater than or equal to about 150 hours. In some embodiments, the aphrons have a half-life exceeding about 200 hours.

In some embodiments, a fluid containing aphrons which enters the formation is clean and essentially solids-free such that damage of the formation is significantly less than with solids-containing fluids. Since no solids or particles are involved in this method, solids removal equipment can be used to keep the fluid as clean as possible.

In addition, while the use of the Aphron Stabilizer has been discussed in terms of aphron containing systems, it is fully within the scope of the invention to use the Aphron Stabilizers in any colloidal or colloidal-like phase containing systems to encapsulate, stabilize, or protect in situ various products, including lubricants, spotting fluids, detergents, drilling enhancers, corrosion inhibitors, polymer breakers, fluid loss additives, polymer cross-linkers, etc. It is contemplated that products stabilized with the Aphron Stabilizer may be able to specifically associate with a target surface and that mechanical, thermal, or chemical forces may permit the product to be disgorged at the target surface, thereby performing an enhanced effect of the product. For example, lubricant droplets could be encapsulated using the Aphron Stabilizer, enabling the droplets to reach and attach themselves to drillpipe and casing, where high shear and compressive forces between the drillpipe and casing rupture the aphron stabilized-shell and disgorge the lubricant directly onto the drillpipe and casing surfaces. This contemplated use is a vast improvement over conventional technology, where a large amount of lubricant has to be continuously applied to a mud system because (1) the lubricant becomes tightly emulsified as the mud circulates and therefore does not adsorb easily, and (2) what lubricant does not become tightly emulsified adsorbs on all surfaces regardless of composition.

Also, the Aphron Stabilizer itself may provide some functionality as a lubricant, spotting fluid, shale inhibitor, wellbore stabilizer, etc. The Aphron Stabilizer may additionally be able to protect cuttings generated during the drilling process, thereby reducing dispersion of the cuttings and enabling the cuttings to be removed from the mud system more easily.

While preferred embodiments of this invention have been shown and described, modification thereof can be made by one skilled in the art without departing from the spirit or teaching of this invention. The embodiments described herein are exemplary only and are not limiting. Many variations and modifications of the compositions and methods are possible and are within the scope of this invention. For example, it is completely within the spirit and scope of the present invention for the various fluid compositions described herein to be mixtures of each other. Accordingly, the scope of protection is not limited to the embodiments described herein, but is only limited by the claims, the scope of which shall include all equivalents of the subject matter of the claims.

What is claimed is:

1. A drilling or servicing fluid composition comprising:
   an aqueous liquid as the continuous phase;
   one or more surfactants;
   aphrons; and
   one or more aphron stabilizers, wherein at least one said aphron stabilizer comprises polyvinyl alcohol, and the composition comprises from about 0.05% to about 2% by weight aphron stabilizer.

2. The composition according to claim 1 further comprising one or more viscosifiers.

3. The composition according to claim 1 wherein the aphrons have an average half-life of greater than or equal to about 20 hours.

4. The composition according to claim 1 wherein the aphrons have an average half life of greater than or equal to about 75 hours.

5. The composition according to claim 1 wherein the aphrons have an average half-life of greater than or equal to about 150 hours.

6. The composition according to claim 1 wherein the aphrons have an average half-life of greater than or equal to about 200 hours.

* * * * *